United States Patent [19]

Roe

[11] Patent Number: 4,780,233

[45] Date of Patent: Oct. 25, 1988

[54] DUST SUPPRESSION METHODS AND COMPOSITIONS

[75] Inventor: Donald C. Roe, Southampton, Pa.

[73] Assignee: Betz Laboratories, Inc., Trevose, Pa.

[21] Appl. No.: 93,439

[22] Filed: Sep. 4, 1987

[51] Int. Cl.$^4$ ............................................. C09K 3/22
[52] U.S. Cl. ................................. 252/88; 106/285; 252/43; 252/49.5; 252/307; 252/312
[58] Field of Search ............... 252/88, 49.5, 43, 307, 252/312; 44/6; 106/285; 404/176

[56] References Cited

U.S. PATENT DOCUMENTS

| | | | |
|---|---|---|---|
| 943,667 | 12/1909 | Ellis | 252/88 |
| 2,621,115 | 12/1952 | Van Order | 44/6 |
| 2,646,361 | 7/1953 | Rostler | 106/238 |
| 2,854,347 | 9/1958 | Booth et al. | 427/154 |
| 3,805,918 | 4/1974 | Altgelt et al. | 585/12 |
| 3,811,660 | 5/1974 | Cole, Jr. | 261/18.1 |
| 3,937,283 | 2/1976 | Blauer et al. | 166/307 |
| 3,954,662 | 5/1976 | Salyer et al. | 252/88 |
| 3,980,136 | 9/1976 | Plummer et al. | 166/280 |
| 4,000,992 | 1/1977 | Cole, Jr. | 55/87 |
| 4,087,572 | 5/1978 | Nimerick | 427/214 |
| 4,136,050 | 1/1979 | Brehm | 252/88 |
| 4,169,170 | 9/1979 | Doeksen | 427/155 |
| 4,171,276 | 10/1979 | Brehm | 252/88 |
| 4,200,413 | 4/1980 | Fitch | 406/49 |
| 4,301,119 | 11/1981 | Cobbs, Jr. et al. | 422/133 |
| 4,380,459 | 4/1983 | Netting | 55/87 |
| 4,400,220 | 8/1983 | Cole, Jr. | 134/18 |
| 4,417,992 | 11/1983 | Bhattacharyya et al. | 252/88 |
| 4,551,261 | 11/1985 | Salihar | 252/88 |
| 4,561,905 | 12/1985 | Kittle | 134/25.1 |
| 4,571,116 | 2/1986 | Patil | 404/76 |
| 4,605,568 | 8/1986 | Kober | 427/220 |
| 4,650,598 | 3/1987 | Roberts et al. | 252/88 |

FOREIGN PATENT DOCUMENTS

| | | | |
|---|---|---|---|
| 0067523 | 6/1981 | Japan . | |
| 59-051993 | 3/1984 | Japan | 252/88 |
| 59-223781 | 12/1984 | Japan | 252/88 |
| 453421 | 1/1975 | U.S.S.R. . | |
| 0589009 | 1/1978 | U.S.S.R. | 55/87 |
| 0916764 | 4/1982 | U.S.S.R. | 252/88 |
| 0934054 | 6/1982 | U.S.S.R. | 252/88 |
| 1078101 | 3/1984 | U.S.S.R. | 55/87 |
| 1133283 | 1/1985 | U.S.S.R. | 252/88 |
| 602406 | 6/1948 | United Kingdom . | |

OTHER PUBLICATIONS

"Foam Suppression of Respirable Coal Dust", Final Report, Dec. 1970, Salyer et al.
"Petroleum Based DCA's to Control Fugitive Dust", Proceedings of the Annual Meeting of the Fertilizer Industry-Roundtable", 1977, Series 27, pp. 94–96.
*Agricultural Engineering*, Sep. 1985, pp. 9–12.

Primary Examiner—Robert A. Wax
Attorney, Agent, or Firm—Alexander D. Ricci; Steven D. Boyd

[57] ABSTRACT

Minor amounts of water insoluble elastomeric polymers are combined with oil. The combination is sprayed or applied in a foam carrier to dust particles to inhibit dissemination thereof which would otherwise occur by windage or transit motion and the like.

21 Claims, 1 Drawing Sheet

—○— COMPARATIVE PRODUCT "A"
—×— THE PRESENT INVENTION-COMPOSITION "A"
---△--- COMPARATIVE PRODUCT "B"
---□--- COMPARATIVE PRODUCT "C"

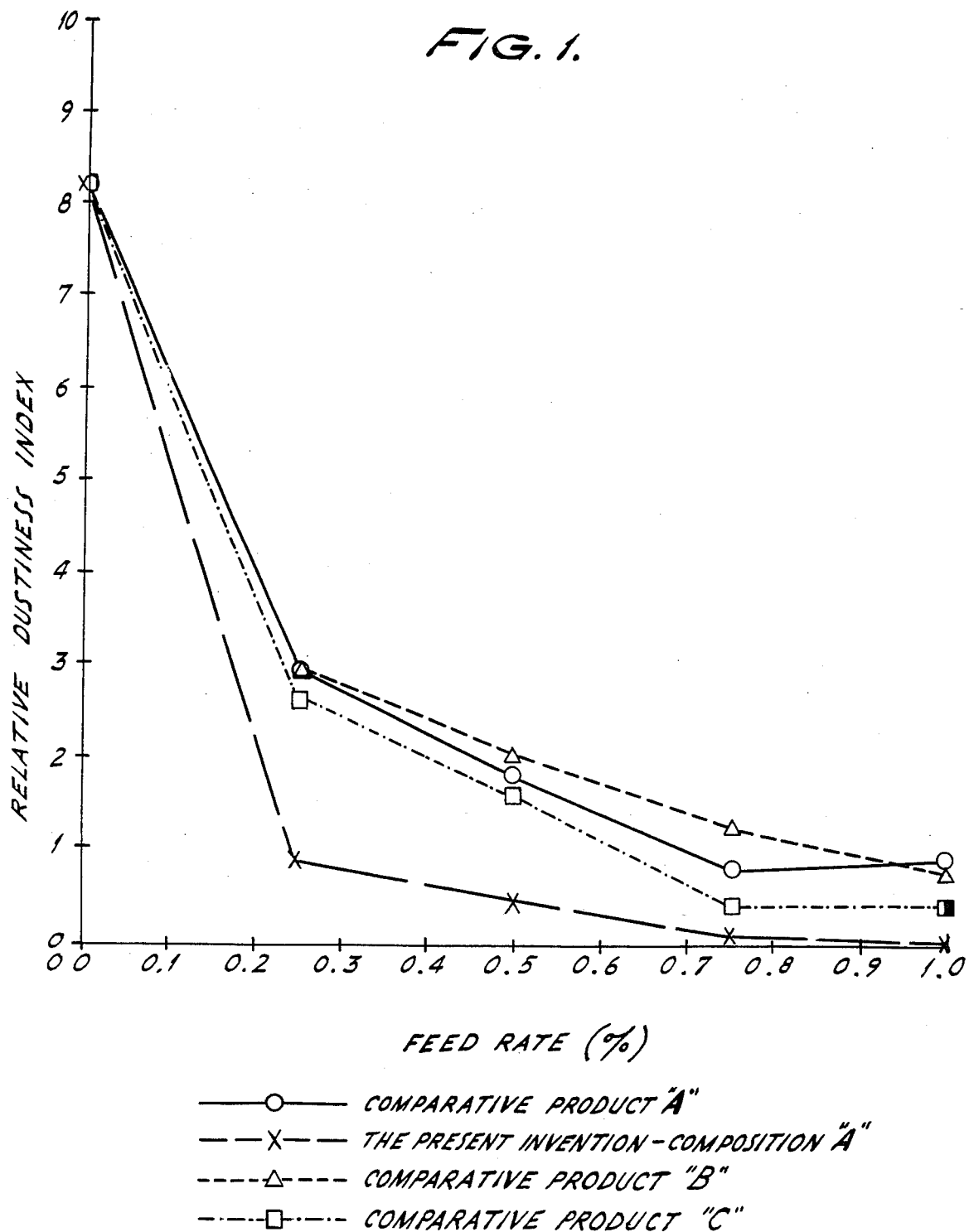

DUST SUPPRESSION METHODS AND COMPOSITIONS

FIELD OF THE INVENTION

The invention pertains to improved methods and compositions adapted to aid in control of the dissemination of fugitive dust particles into the atmosphere.

BACKGROUND

Dust dissemination poses safety, health and environmental problems in many commercial environments. For instance, dust suppression is of particular concern in the coal mining industry wherein coal dust dissemination caused by wind or transit motion may lead to black lung disease if inhaled over lengthy periods or, in other cases, to possible spontaneous combustion of the small dust particles. Similar concerns are raised when other materials such as sulfur, phosphates, clays, or other finely divided ores and minerals generate dust in handling operations during mining, transportation, storage or use.

In addition to the mining industry, many other commercial activities also provide potential for dust control problems. For instance, fertilizer dust has raised health concerns due to human and animal inhalation thereof and it also poses the problem of spontaneous combustion. The cement industry also is concerned with fugitive dust dissemination during the manufacture, transport and storage steps.

Industrial sources of fugitive dust include open operations, leaks and spills, storage, disposal, transit or poor housekeeping of sundry finely divided solids particulates. The iron and steel industries are replete with examples of the above enumerated categories. Problems associated with disposal and storage of the source of fugitive dust may be exemplified by, for instance, operation of a steel mill open hearth precipitator of the type having an electrostatic precipitator to control dust emissions. The dust removed by the electrostatic precipitator is typically collected in hoppers and periodically dumped into essentially closed containers known as "collecting pans." Despite the fact that connecting hoses are extended between the hopper and collecting pan, considerable fugitive dust emissions occur during material transfer. If the electrostatically removed particulate matter is to be used as landfill, severe fugitive dust emissions can occur during the dumping thereof. Natural winds have been reported as creating great dust clouds at such landfill sites. The transportation of particulates along conveyor belts and the dumping of the particulates therefrom also create fugitive dust emission problems of the "transportation and disposal" source type.

SUMMARY OF THE INVENTION

The present invention provides improvement over the conventional use of sprayed or foamed oil containing dust control treatments in that a small amount of a water insoluble elastomeric polymer is included with the oil and applied to the dust. Inclusion of the elastomer significantly improves the dust control performance and provides economies in that less dust control agent can be used.

PRIOR ART

Oil and oil-based emulsions have been previously used for dust control purposes. For instance, in 1977, Frick suggested that petroleum based products be used to control fugitive dust emanating from agricultural fertilizer granules, See "Petroleum Based DCA's to Control Fugitive Dust", Frick, *Proceedings of the Annual Meeting of the Fertilizer Industry, Round Table,* Series 27, pages 94–96. Similarly, U.S. Pat. No. 4,417,992 (Bhattacharyya) discloses, inter alia, use of oil containing emulsions comprising light paraffinic solvents, water, and sundry cross-linked polymers for dust control.

Oil additives have been used to control grain dust as per an article appearing in *Agricultural Engineering,* September 1985, pages 9–12. Kittle Patent, U.S. Pat. No. 4,561,905, reports the use of foamed oil/water emulsions to control coal dust dissemination. In U.S. Pat. No. 4,571,116 (Patil et al.), aqueous emulsions comprising asphalt, petroleum extender oils, protective colloids, and surfactants are sprayed onto dusty substrates such as on dirt or gravel roads.

The use of water insoluble elastomeric substances including natural rubbers and synthetic polymers to prevent erosion of finely divided ores, coal, etc. is taught by Booth et al. in U.S. Pat. No. 2,854,347. U.S. Pat. No. 4,551,261 (Salihar) teaches that the Booth et al. elastomeric substances can be incorporated into an aqueous foam comprising water and foaming agents (surfactants) and used to suppress dust generation.

DETAILED DESCRIPTION

The present invention provides improvement over the known use of oil containing treatments for dust control purposes. It has been discovered that the addition of a small amount of a water insoluble elastomeric polymer to an oil-based treatment results in improved dust control efficacy compared to oil alone. This is believed to be due to the fact that the elastomeric polymer imparts a tackiness to the oil, thereby enhancing the adhesional properties desired for effective dust control. While tacky-type oils have been formulated for "no-drip" and "anti-spatter" lubricant applications, the use of oils containing a tackiness agent for dust control purposes is believed to be novel and an improvement in the prior art.

As to the tackiness imparting water insoluble elastomers that can be used, these are described in aforementioned U.S. Pat. Nos. 4,551,261 (Salihar) and Booth et al., 2,854,347. These generally may be described as being synthetic rubber-like polymers which encompass copolymers of butadiene with a monoolefinic monomer such as styrene, methylstyrene, dimethylstyrene and acrylonitrile. Copolymers of methyl, ethyl and butyl acrylates with acrylonitrile or with styrene may also be mentioned. Plasticized polyvinyl acetate, plasticized polyvinyl chloride, plasticized polystyrene, plasticized substituted polystyrenes, and plasticized polyolefins such as polyethylenes and polyisobutylenes are suitable. At present, it is preferred to utilize a polyisobutylene elastomer having a molecular weight within the range of about 500,000 to about 2 million, with a particular polyisobutylene of around 1 million molecular weight being especially preferred. It is essential that the elastomer be water insoluble so that it is carried by the oil phase of the sprayed or foamed treatment. In this manner, it is though that the elastomer serves to increase the tackiness of the oil, thereby extending or enhancing the oil's dust control efficacy. As used broadly herein, the term oil includes mineral (petroleum or petroleum derived), vegetable and animal oils.

The oil and the elastomer may be applied to the dusty material separately or concurrently. Concurrent addition is preferred. The oil/elastomer combination is preferably provided in the form of an O/W or W/O emulsion, but it is to be noted that a neat oil/elastomer mixture or solution may also be used.

Any oil material capable of being sprayed or applied via foam may be used. Especially pereferred are oils that are capable of being emulsified in an O/W or W/O emulsion. For example, asphalts, extender oils of the types noted in U.S. Pat. No. 4,571,116, heavy process oils, and light process oils may be mentioned. The heavy process oils are of the type specified by Kittle, U.S. Pat. No. 4,561,905. That is, they include asphalt "cut-backs", i.e., asphalt dissolved in a moderately heavy oil such as No. 3 fuel oil, residual fuel oils of relatively high viscosity such as No. 6 fuel oil, etc. The heavy process oils may be further defined as having viscosities in the range of about 600–7,000 SUS. One exemplary heavy process oil is "Hydrolene 90" sold by Sun Oil Company. This particular product is a low volatile aromatic oil having an SUS viscosity of about 3500 at 38° C.

Preferred oils are classified as "light viscosity process oils." These have SUS viscosities of about 60–600 measured at 38° C. Highly preferred are those having an SUS viscosity of from about 200–400. The latter are commercially available under the "Shellflex", "Tellura" and "Tufflo" trademarks.

Surfactants are used to emulsify the oil/water mixture. For this purpose, well-known and commercially available anionic and/or nonionic surfactants suffice. For instance, acceptable anionic surfactants include alkyl aryl sulfonic acids, alkyl sulfonic acids, alkenyl sulfonic acids, sulfonated alkyls, sulfonated alkenyls, sulfated monoglycerides and sulfated fatty esters. Also, long chain alpha olefin sulfonates, water soluble salts of alkenyl sulfonic acid, water soluble alkyl aryl sulfonic acid salts, water soluble salts of sodium lauryl sulfate, etc. may be mentioned.

Nonionic surfactants which may be used include ethylene oxide condensates of alkylphenols, ethylene oxide condensates of straight chain alcohols, fatty acid amides, etc.

The oil/water insoluble elastomer may be applied to the dust in neat or emulsified form. The treatment may be sprayed onto the dust or applied in the form of a foam. Based upon preliminary studies, it is preferred to apply an emulsion comprising oil/elastomer/water in the foam form.

When the emulsion is to be sprayed, acceptable oil containing solutions may be provided in one drum. Exemplary compositions are:

| | |
|---|---|
| 1–25 wt % | Anionic and/or nonionic surfactants |
| .01–0.3 wt % | Water insoluble elastomeric polymer (Note that commercially available products comprise water insoluble elastomeric polymers in solution with an oil solvent) |
| Remainder | Oil |

The oil solution is mixed with water at the job site to form an emulsion and is then sprayed onto the desired dust. Generally, enough water and oil solution is mixed and sprayed so that from about 0.01 gallon of the oil/elastomer mixture to about 5.0 gallons per ton of treated dust is supplied. The specific amount of oil/elastomer mixture to be applied depends, of course, upon dust type, wind and weather factors, spray location, etc.

At present, a preferred oil solution adapted for application via spray technique is

| | |
|---|---|
| 5.0 wt % | Isopropylamine dodecylbenzene sulfonate |
| 4.0 wt % | Oleic acid |
| .06 wt % | Polyisobutylene, Mw $1 \times 10^6$ |
| Remainder | Light process oil, 275 SUS @ 100° F. |

It is preferred to form an oil/water insoluble elastomer/water emulsion and then apply it to the dust in form of a foam. For this type of application, the oil-elastomer combination can be provided as a solution. The oil/elastomer solution is mixed with a water/surfactant solution upstream from or at a foaming nozzle wherein additional water and air will be provided to result in an acceptable foamed emulsion.

| Exemplary Compositions for Foaming | |
|---|---|
| Oil Solution (OS) | Surfactant Solution (SS) |
| .01–0.3 wt % water insoluble elastomer Remainder oil light process oil 275 SUS @ 100° F. | 10–50% anionic and/or nonionic surfactant Remainder water |

| Preferred Compositions for Foaming | |
|---|---|
| Oil Solution (OS) | Surfactant Solution (SS) |
| .06 wt % water insoluble elastomer Remainder light process oil 275 SUS @ 100° F. | 6 wt % sodium alpha olefin sulfonate 5.5% sodium alkyl ether sulfate Remainder water |

The oil solution (OS), surfactant solution (SS) and additional water are mixed at a foaming nozzle or upstream from one within the following component mixing ranges (all percentages adding up to 100 wt%):

| OS | SS | Makeup Water |
|---|---|---|
| 1–20 | 0.5–5.0 | 75–98.5 |

Air is preferred for use as the foam forming gas. Details of the foam forming process are not critical to the invention. Generally, foam may be produced as stated in U.S. Pat. No. 4,400,200 (Cole). Typically, the OS, SS, and makeup water will be mixed with air at a ratio of about 1 gallon liquid (OS, SS and makeup water) to 1.0 to 10.0 scf air. The air and liquid may combine at a point immediately upstream from the mixing chamber. The mixing chamber may be a packed column, venturi, or static mixer. The purpose of the mixing chamber is to induce the air in liquid dispersion defined as foam. It is important that from about 0.01 gallon to 5.0 gallons of the OS product be applied via the foam carrier per ton of treated dust. Acceptable foam properties include expansion ratios (volume foam:volume of OS, SS, and makeup water) of about 10–100. Desirable foam bubble diameters are on the order of about 0.005 to 0.015 inch.

DRAWINGS

FIG. 1 is a graphical depiction of the data gathered in the "comparative testing" portion of the ensuing examples.

EXAMPLES

The following examples are illustrative of the invention:

In order to demonstrate the efficacy of the elastomeric dust control enhancers of the present invention, a series of laboratory tests were undertaken. A lab scale dust chamber was created. The particulate, dusty material treated was ¼ in XO, hot (275° F.) calcined coke dust. Oil, as the dust control additive, was tested by itself and in combination with varying amounts of a polyisobutylene extender. All of the treatments were applied as O/W emulsions in spray form (10% oil or oil plus extender, 0.5% nonionic surfactant-alkyl phenol ethoxylate, 0.5% polyethylene glycol, remainder water). The emulsions were sprayed onto the dust via a hand held trigger-type sprayer. Treatment rates were 0.5 gallon oil or oil plus extender per ton of coke dust.

Relative dustiness testing was performed after the samples had been treated and stored for 24 hours at 225° F., and again after 24 hours' storage at 70° F. Percent dust suppression was calculated based on the relative dustiness index (R.D.I.) of treated and untreated samples.

% Dust Suppression =

$$\frac{\text{Untreated } RDI - \text{Treated } RDI}{\text{Untreated } RDI} \times 100\%$$

Results are reported in Tables I and II.

TABLE I

| Treatment % | | | Relative Dustiness Index (RDI) | | % Dust Suppression | |
|---|---|---|---|---|---|---|
| Oil A | Elastomer A (actives) | | 70° F. | 225° F. | 70° F. | 225° F. |
| — | — | (control) | 16.4 | 20.5 | — | — |
| 100 | 0 | | 8.1 | 10.7 | 51 | 48 |
| 99.94% | 0.06% | | 4.6 | 7.6 | 72 | 63 |
| 99.88% | 0.12% | | 6.5 | 10.7 | 60 | 48 |
| 99.79% | 0.21% | | 4.3 | 7.6 | 74 | 63 |
| 99.70 | 0.30% | | 5.0 | 8.9 | 70 | 57 |

TABLE II

| Treatment % | | | Relative Dustiness Index (RDI) | | % Dust Suppression | |
|---|---|---|---|---|---|---|
| Oil A | Elastomer A (actives) | | 70° F. | 225° F. | 70° F. | 225° F. |
| — | — | (control) | 18.4 | 24.1 | — | — |
| 100% | 0 | | 7.7 | 11.0 | 58.2 | 54.4 |
| 99.7% | 0.03% | | 7.7 | 10.6 | 58.2 | 56.0 |
| 99.94% | 0.06% | | 5.5 | 8.4 | 70.1 | 65.1 |
| 99.88% | 0.12% | | 5.6 | 7.9 | 69.6 | 67.2 |

Oil A = Naphthenic process oil, 275 SUS @ 100° F.
Elastomer A = polyisobutylene, Mw ≈ 1,000,000.

As Tables I and II indicate, the addition of as little as 0.03% polyisobutylene elastomer to the oil significantly enhances the dust control efficacy compared to oil alone. The 0.12% polyisobutylene data of Table I are apparently in error due to the substantial improvement shown by the Table II data at the same elastomer addition level.

It is noted that, although the oil/elastomer blends were applied as sprayed emulsions for the Table I and II examples, it is thought that the optimum method for applying the oil/elastomer dust control treatments will be as foamed, O/W emulsions containing the elastomeric extender.

COMPARATIVE TESTING

Comparative tests were performed on coal dust samples. A graphical depiction of the test results may be seen in FIG. 1. The x-axis of the graph is given in terms of feedrate % equals % product fed based on the weight of coal tested.

Comparative Product A=lignosulfonate based product
Comparative Product B=an acrylic latex based product
Comparative Product C=a cationic polymer solution
The present invention, Composition "A", is:

| 0.06% | polyisobutylene, Mw ≈ 1,000,000 |
|---|---|
| Remainder | mostly light naphthenic process oil having 275 SUS @ 100° F. |

FIG. 1 shows the significantly enhanced dust control results of Composition "A" in comparison to use of commercially available dust control treatments.

The oil/elastomer dust control treatment may be applied to any dust particles which present a problem of undesired air-borne dissemination. For example, coal dust, green or calcined petroleum coke dust, steel mill sinter dust, metallurgical coke dust, fertilizer dusts including raw materials process and product dusts, cement raw materials and clinker, and basic oxygen furnace dust may be mentioned.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. In a method for reducing the dissemination of fugitive dust particles into the atmosphere wherein oil is applied to said dust particles, the improvement comprising also applying from a trace to about 0.06 weight %, based upon the weight of said oil, of a water insoluble elastomeric polymer to said dust particles, said polymer being effective to increase the dust suppressing efficacy of said oil.

2. Method as recited in claim 1 wherein between about 0.01 to about 5 gallons of said oil and said elastomer, in combination, per ton of said dust, is applied.

3. Method as recited in claim 2 wherein said combination of oil and elastomer is applied by spraying.

4. Method as recited in claim 2 wherein said combination of oil and elastomer is applied in the form of a foam.

5. Method as recited in claim 1 wherein said water insoluble elastomeric polymer comprises polyisobutylene having a molecular weight of from about 500,000 to about 2 million.

6. Method as recited in claim 5 wherein said polyisobutylene has a molecular weight of about 1 million.

7. Method as recited in claim 1 wherein said dust comprises green or calcined petroleum coke dust.

8. Method as recited in claim 1 wherein said dust comprises coal dust.

9. Method as recited in claim 1 wherein said dust is discharged from a basic oxygen furnace.

10. Method as recited in claim 1 wherein said dust is steel mill sinter dust.

11. Method as recited in claim 1 wherein said dust is metallurgical coke dust.

12. Method as recited in claim 1 wherein said dust is fertilizer raw material, process and product dust.

13. Method as recited in claim 1 wherein said dust is cement raw material or clinker dust.

14. Method as recited in claim 1 wherein said oil is a light viscosity process oil having an SUS viscosity at 38° C. of from about 60–600.

15. Method as recited in claim 1 wherein said oil has an SUS viscosity at 38° C. of from about 200 to around 400.

16. Composition comprising, in combination, oil, anionic and/or nonionic surfactant, and from a trace to about 0.06 weight percent, based upon the weight of said oil, water insoluble elastomeric polymer.

17. Composition as recited in claim 16, comprising 1–25 wt % anionic and/or nonionic surfactant, about 0.01–0.06 wt % water insoluble elastomeric polymer, remainder oil.

18. Composition as recited in claim 17 wherein said water insoluble elastomeric polymer is polyisobutylene.

19. Composition as recited in claim 18 comprising about 5.0 wt % isopropylamine dodecylbenzene sulfonate, about 4.0 wt % oleic acid, about 0.06 wt % said polyisobutylene, remainder oil.

20. Foamed mixture comprising a compositions as recited in claim 16, water and sufficient gas to form foam.

21. Foamed mixture of claim 20 wherein said composition includes about 0.06 weight percent polyisobutylene, about 9 weight percent anionic and/or nonionic surfactant and the remainder oil.

* * * * *